United States Patent [19]
Giesinger et al.

[11] Patent Number: 6,063,195
[45] Date of Patent: May 16, 2000

[54] POWDER COATING SYSTEM AND METHOD

[75] Inventors: Hans Giesinger; Horst Adams, both of St. Gallen, Switzerland; Wolfgang Keller, Wald-Ruhestetten, Germany; Beat Untersee, Altstätten, Switzerland

[73] Assignee: Wagner Industrial AG, Altstratten, Switzerland

[21] Appl. No.: 09/065,761

[22] Filed: Apr. 23, 1998

[30] Foreign Application Priority Data

Apr. 24, 1997 [DE] Germany ................ 197 17 353

[51] Int. Cl.⁷ .................................. B05C 19/00
[52] U.S. Cl. ................ 118/712; 118/308; 118/313; 118/314; 118/315
[58] Field of Search .................... 118/631, 630, 118/629, 688, 689, 665, 684, 313, 314, 315, 308, 712; 222/23, 39, 308

[56] References Cited

U.S. PATENT DOCUMENTS 3,402,697  9/1968  Kock ............................ 118/631
5,060,860  10/1991  Megerie ......................... 239/67

FOREIGN PATENT DOCUMENTS

| | | |
|---|---|---|
| 29 45 934 A1 | 5/1980 | Germany . |
| 33 40510 A1 | 5/1985 | Germany . |
| 3721875 A1 | 1/1989 | Germany . |
| 4406046 A1 | 8/1995 | Germany . |
| 195 02 741 A1 | 1/1996 | Germany . |
| 195 24 327 A1 | 4/1996 | Germany . |
| 44 43 859 A1 | 6/1996 | Germany . |
| 196 50 112 C1 | 5/1998 | Germany . |
| 58-151517 | 12/1983 | Japan . |
| 3-125924 | 5/1991 | Japan . |

OTHER PUBLICATIONS

Derwent English Language Abstract of DE 4406046 Acc. No. 1995–294439.

Überwachung and Steuerung elektrokinetischer Pulversprühgeräte, I–Lack Apr. 1989, p. 137.

*Primary Examiner*—Laura Edwards
*Attorney, Agent, or Firm*—Fenwick & West LLP

[57] ABSTRACT

A powder coating system and method comprises a plurality of coating units arranged substantially vertically one on top of the other for simultaneous powder discharge to a workpiece which is moved in horizontal direction past the coating units, and further comprises a monitoring means for detecting a powder stream which flows through the respective coating units.

14 Claims, 3 Drawing Sheets ced 6,063,195

POWDER COATING SYSTEM AND METHOD

FIELD OF THE INVENTION

The invention relates to powder coating system comprising a plurality of coating units which are arranged substantially vertically one on top of the other.

BACKGROUND OF THE INVENTION

In known powder coating system the workpieces to be coated are moved within a coating cabin in horizontal direction past powder coating guns which are moved up and down so that the whole workpiece will be exposed to the powder. As a rule, a plurality of coating guns are arranged to succeed one another (horizontally) in the direction of passage of the workpieces. There are historical reasons for configurations which comprise several coating guns, one behind the other:

The powder coating efficiency so far was not such as to allow only one coating gun to be moved up and down and yet produce a coated workpiece. A sufficiently thick coat could be achieved only with a plurality of coating guns disposed in series behind one another.

The amount of powder discharged by a single coating gun per unit time was not sufficiently constant and satisfactory homogeneity of the powder coat consequently could be obtained only by cooperation of a plurality of coating guns arranged one behind the other.

In the meantime, a great step ahead was taken in the development of powder coating technology as regards the two points mentioned above, and nowadays coating system is built in which the coating guns are disposed in vertical orientation above each other so that, with the workpiece passing them in horizontal direction, only one coating gun each is "respon-sible" for coating a particular horizontal stripe of the workpiece. This configuration has the advantage of allowing the coating cabin to be much shorter, as will be readily apparent to those skilled in the art. In this respect reference is made also to FIGS. 1 and 2 which will be explained in greater detail below.

The arrangement of vertically aligned coating guns, however, gives rise to a new problem. If there is a variation in the amount of powder discharged from a coating gun, or if a coating gun fails altogether (e.g. due to plugging in the powder supply hose or nozzle) then a full horizontal stripe on the workpiece will be provided with too thin a coat or none at all. Moreover, this flaw cannot be made up for by subsequent coating guns, as would be the case if there were a horizontal succession of coating guns.

SUMMARY OF THE INVENTION

It is, therefore, an object of the instant invention to provide powder coating system which comprises a plurality of coating units arranged vertically above one another and with which it is assuredthat the quality of the coat on the workpiece will not be deteriorated if a coating unit should happen to suffer a disturbance or failure.

The invention suggests a monitoring means which may be incorporated in the powder supply line of a coating unit or in the coating unit itself and which provides a signal as soon as the quantity of the flowing powder stream either drops below a desired value which may have been set in advance or disappears altogether. In the powder coating system and with the method according to the invention the proper flow of powder is monitored for each coating unit and an alarm can be released as soon as the quantity of powder discharged by a coating unit falls short of the requirement or ceases to exist.

The measuring signal which reflects the powder quantity or the presence of a powder stream may be generated in any of various suitable ways.

The monitoring means is adapted to detect a tribo tension generated by the powder stream in the powder path of a powder coating unit. To that end, for instance, the propelling nozzle of the powder conveying injector or a means for supplying powder to the coating unit is made of a material which will produce tribo tension or frictional tension as soon as powder particles are conveyed. The tribo tension depends on the quantity of powder being delivered and is transmitted to the wall of the powder conveying path whence, normally, it would be passed on to earth by a line. The tribo tension can be exploited directly by providing either a metal casing for the injector, a metal portion in the powder channel of the coating unit, or a metal section in the means supplying the powder to the coating unit. For example, if the injector is installed in insulated fashion in a plastic retainer and a current measuring instrument is inserted in the line leading to ground, the tribo current flowing towards ground can be measured based on the tribo tension generated. Measuring the tribo current can provide a signal which indicates whether or not powder is flowing and, possibly, what the proportion of powder is in the powder-air stream. A threshold value may be defined such that an alarm or the like will be triggered if the tribo current drops below a predetermined value.

Instead of measuring the tribo tension or tribo current, it is possible to measure the velocity of the powder stream in the powder path, the mass of powder contained in the powder stream flowing in a section of the powder path, or the powder-mass stream in the powder path. Apparatus and methods as disclosed in DE-A-44 06 046 and DE-A-196 50 112 may be used for this purpose. Specific reference is made to the aforementioned patent applications and, by this reference, the apparatus and methods specified in them for measuring the velocity of the powder stream, the density of the powder stream, and the powder-mass stream are incorporated in the instant application.

DESCRIPTION OF THE DRAWINGS

The invention will be described further, by way of example, with reference to the accompanying drawings, in which.

DETAILED DESCRIPTION OF THE INVENTION

Figure 1:
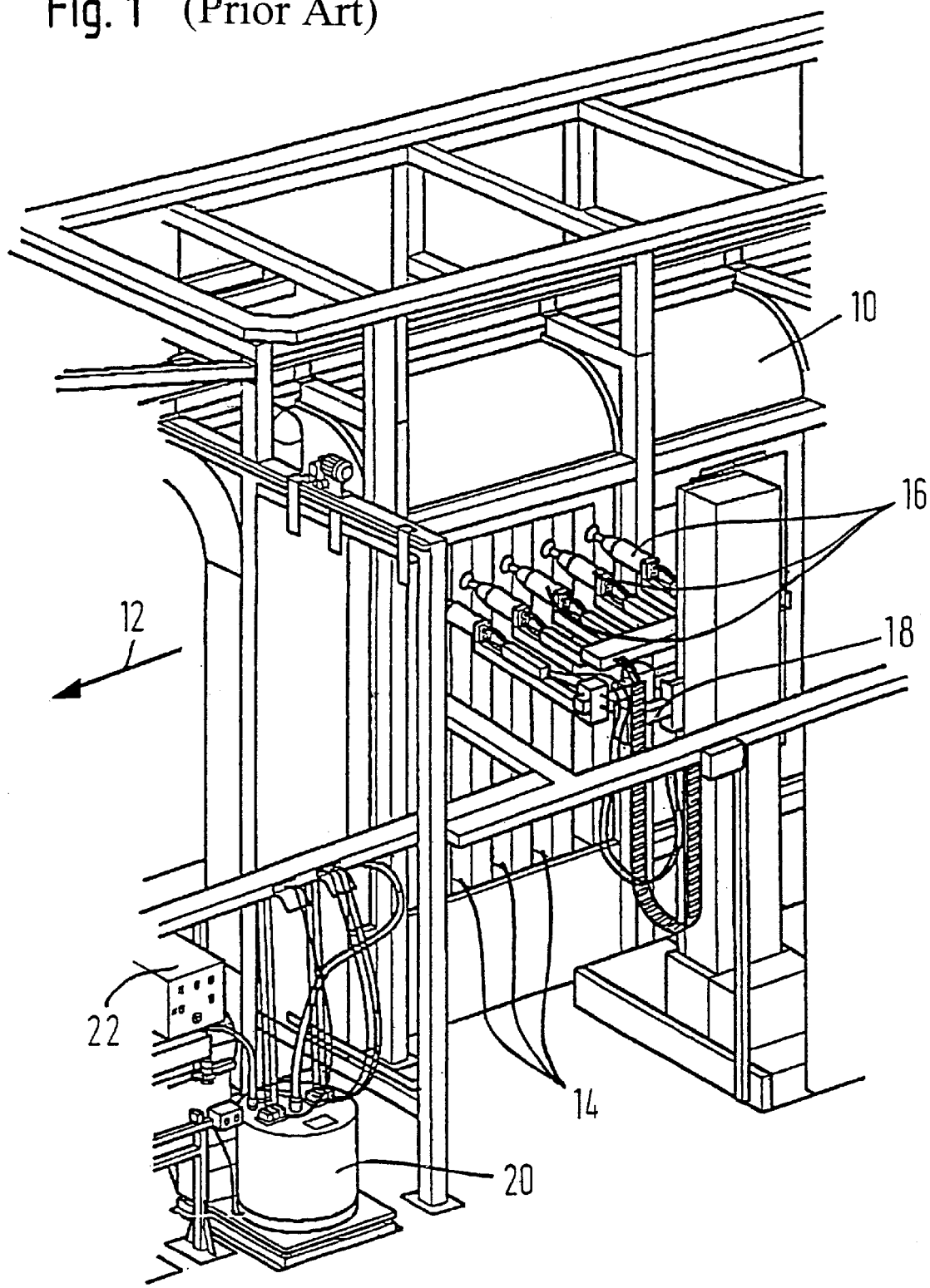
FIG. 1 illustrates known powder coating system.

FIG. 1 shows a conventional coating cabin 10 of a powder coating system through which a workpiece to be coated is moved in the direction of arrow 12. Normally, the workpiece (not shown) is suspended from a conveyor rail while being guided through the coating cabin 10. One side wall of the coating cabin is formed with vertical slots 14 through which a plurality of coating guns 16, arranged horizontally in a row, introduce powder into the coating cabin 10 to be deposited on the workpiece. The coating guns 16 are mounted on a carriage 18 adapted to carry out reciprocating movements in vertical direction. As the workpiece is advanced through the coating cabin 10 in the direction of arrow 12, the coating guns 16 move up and down on the carriage 18 so as to apply a uniform coat on the workpiece. Likewise shown in FIG. 1 are a powder reservoir 20 with the requisite air and powder conduits and a control apparatus 22.

With this known powder coating system the plurality of coating guns 16 are arranged horizontally one behind the other in the direction of passage 12 of the workpiece and they reciprocate in vertical direction in order to apply a uniform powder coat on the workpiece. The efficiency of the former coating guns was not such as to provide a sufficiently thick coating film by means of a single coating gun. Furthermore, the amount of powder ejected from one coating gun 16 per unit time was not sufficiently constant to guarantee that the resulting thickness of the coat would be uniform. A desirable uniform and sufficient thickness of the coat could be obtained only by cooperation of a number of coating guns arranged in succession. However, arranging a plurality of coating guns 16 one behind the other in the direction of passage of the workpiece necessarily caused the coating cabins to become rather long.

Figure 2:
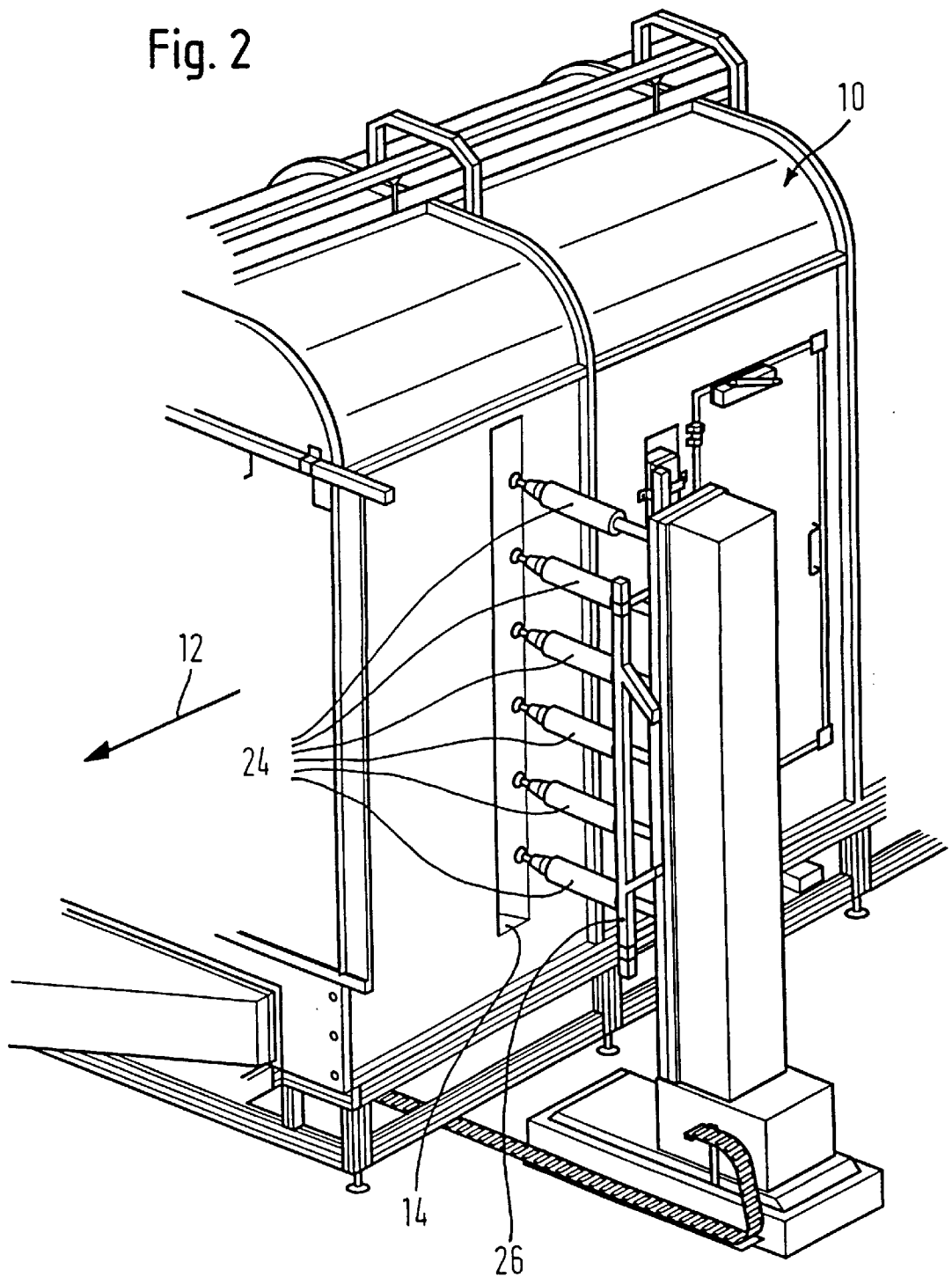
FIG. 2 illustrates powder coating system according to the invention.

FIG. 2 illustrates an example of electrostatic powder coating system according to the invention which has the coating guns or spray guns 24 arranged vertically one above the other. In FIG. 2, the same reference numerals are used as in FIG. 1 to designate similar structural members which thus will not be described once more.

The coating guns 24 are mounted on a frame 26 which is movable in vertical direction. In a simplified embodiment they might be stationary.

In the powder coating system according to FIG. 2 in which the coating guns 24 are arranged vertically one above the other, the workpiece likewise moves through the coating cabin 10 in the direction of arrow 12. Now, however, the coating guns 24 each coat only a horizontal "stripe" of the workpiece (or a sine-shaped undulating line—if the coating guns 24 are moved up and down). With this novel type of powder coating system the powder coating cabin 10 can be built to be much shorter in the direction of passage 12 of the workpiece. Yet the overall system no longer is as "foolproof" as it is with a plurality of spray guns one behind the other, nor can the "averaging" of powder discharge be achieved through a plurality of coating guns applying powder on the same "stripe" of the workpiece. For these reasons it is a particularly important aspect of the powder coating system according to the instant invention to make sure that the coating guns 24 operate properly. To accomplish that, a monitoring means for detecting the flow of powder through the respective coating guns 24 is provided according to the invention. An embodiment of the monitoring means is illustrated in FIG. 3.

Figure 3:
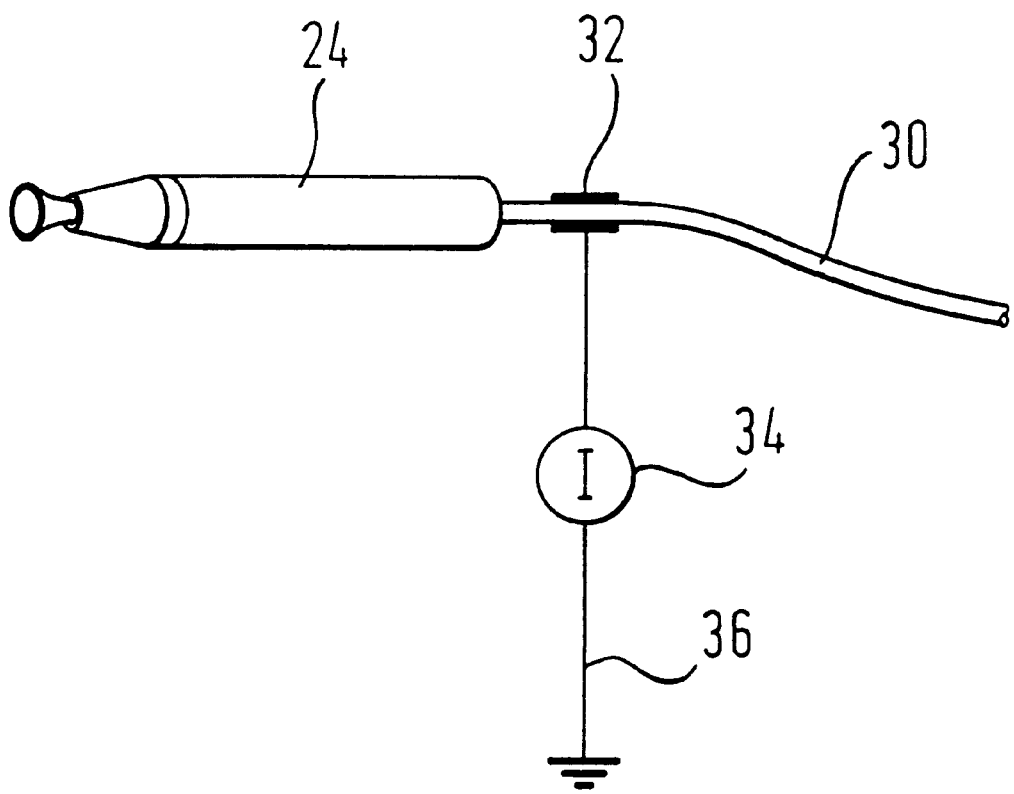
FIG. 3 illustrates a circuit for detecting the tribo tension of a powder coating unit.

FIG. 3 shows a coating gun 24 with a powder supply line 30. The powder supply line 30 in part 32 is made of a material which generates tribo tension or frictional tension as soon as powder particles are conveyed through the line 30. This tribo tension is transmitted to the metal sleeve 32 and, normally, would be carried off by a ground connecting line. According to the invention, however, the supply line 30 is not connected directly to ground. Instead, it is connected via a current measuring instrument 34 to a ground connecting line 36. In an alternative embodiment the powder conveying injector (not shown) in the powder coating gun 24 may be made of a material which generates the tribo tension. In this case the injector is mounted in insulated fashion, for instance, in a retainer made of plastics and connected through the current measuring instrument 34 to the ground connecting line 36.

The tribo tension is dependent on the quantity of powder being conveyed. Measuring the tribo tension, therefore, provides a signal which indicates whether or not there is a flow of powder and, if so, possibly also how much powder is being conveyed. A threshold value may be defined such that an alarm will be released if the tribo tension drops below that value. The alarm either indicates complete failure of a coating gun 24 or it may indicate that the amount of powder discharged by at least one of the coating guns is insufficient to produce a proper coat. In this event the coating process also may be interrupted automatically, if desired. In an alternative embodiment (not shown) provision may be made for an additional coating gun mounted on the frame 26 so as to be vertically movable to the level of the faulty or broken down coating gun to take over the task of the deficient coating gun.

Alternative means for monitoring the flow of powder through the respective coating guns 24 are disclosed in DE-A-44 06 046 and DE-A-196 50 112. Those publications describe apparatus and methods serving to measure the powder mass per unit volume;

to measure the velocity of the powder-air stream;

to measure the powder-mass stream during conveyance of the powder-air mixture;

and being suitable for use in detecting the powder stream through the powder supply line and the coating gun, respectively. Express reference is made to the disclosure in the two patent applications mentioned. In agreement with the teaching of those publications in particular the monitoring means may comprise speed measuring instruments to measure the velocities of the powder streams through the coating guns. Such a speed measuring instrument comprises two measuring electrodes disposed spaced from each other along the powder path to detect load variations in the powder path caused by the powder stream being conveyed and to determine the velocity of the powder stream based on the load variations detected. The monitoring means also may comprise measuring instruments to measure the powder mass per unit volume in a respective section each of the powder path. The mass measuring instrument comprises a microwave resonator as well as means to detect a change in the resonant frequency and/or the microwave amplitude of the microwave resonator and to derive the powder mass in the powder path section from the resonant frequency and/or the microwave amplitude detected. The determination of the powder stream by the combined use of mass and speed measuring instruments can be rendered especially accurate if a computer is used in addition to caculate a powder-mass flow based on the velocity measured, the powder mass per unit volume measured, and the dimensions of the powder path.

The features disclosed in the specification above, the claims, the drawing, and in the cited German patent applications DE-A-44 06 046 and DE-A-196 50 112 may be significant, both individually and in any combination, for realizing the invention in its various embodiments.

What is claimed is:

1. Powder coating system, comprising:
    a plurality of coating units (24) arranged substantially vertically one above the other for simultaneous powder discharge to a workpiece which is moved with a horizontal component past the coating units;
    monitoring means for each coating unit disposed for detecting a powder stream which flows through the respective coating unit to provide a signal indicative of the flow of the powder stream through such coating unit relative to a selected flow value to indicate insufficient amount of powder discharged from a coating unit.

2. The powder coating system as claimed in claim 1 comprising:

a power path for each coating unit including a powder supply line (30) leading to the coating unit (24) and a powder conveying means associated with each coating unit (24), and wherein each monitoring means includes a detector coupled to a respective powder path of a coating unit.

3. The powder coating system as claimed in claim 1, characterized in that each of the monitoring means (32, 34) detects tribo tensions generated by the powder stream flowing through the respective coating unit.

4. The powder coating system as claimed in claim 2 comprising:

a current sensing instrument for each coating unit connected to sense electrical current flow with respect to the powder path of each coating unit.

5. The powder coating system as claimed in claim 1, characterized in that each of the monitoring means comprises a speed measuring instrument to measure the velocity of flow of the powder stream passing through the respective coating unit.

6. The powder coating system as claimed in claim 5, characterized in that the speed measuring instrument comprises two measuring electrodes disposed spaced from each other along the powder path to detect load variations in the powder path caused by the powder stream being conveyed and to determine the velocity of the powder stream based on the load variations detected.

7. The powder coating system as claimed in any one of claims 1 or 2 or 3 or 4 or 5 or 6, characterized in that each of the monitoring means comprises a measuring instrument to measure the powder mass per unit volume in a respective section of each of the powder paths.

8. The powder coating system as claimed in claim 7, characterized in that each of the mass measuring instruments comprises a microwave resonator and means to detect a change in the resonant frequency or the microwave amplitude of the microwave resonator for determining the powder mass in the powder path section from the resonant frequency or microwave amplitude detected.

9. The powder coating system as claimed in claim 7, characterized in that the monitoring means comprises a computer to calculate a powder-mass stream based on the velocity measured, the powder mass per unit volume measured, and the dimensions of the powder path.

10. The powder coating system as claimed in claim 1, characterized in that the plurality of coating units (24) arranged substantially vertically one above the other are stationary and the workpiece is guided past them in horizontal direction.

11. The powder coating system as claimed in any one of claims 1 or 2 or 3 to 10, characterized in that the plurality of coating units (24) arranged substantially vertically one above the other are movable jointly in vertical direction and the workpiece is guided past them in horizontal direction.

12. The powder coating system as claimed in claim 1 characterized by an additional coating unit which is movable in vertical direction to selectively replace another coating unit for which an insufficient powder stream is detected.

13. The powder coating system as claimed in any one of the claims 1 or 2 or 3 to 6 or 10 or 12 comprising:

means disposed to stop operations of the powder coating system upon detection of an insufficient powder stream of a coating unit.

14. The powder coating system as claimed in claim 13 wherein the means detects a powder stream through a coating unit failing to attain a selected flow value as an indication of failure of such coating unit.

* * * * *